(12) United States Patent
Soryal

(10) Patent No.: US 11,438,803 B2
(45) Date of Patent: Sep. 6, 2022

(54) INDIVIDUAL MOBILE DEVICES AS EDGE NETWORK

(71) Applicant: AT&T Intellectual Property I, L.P., Atlanta, GA (US)

(72) Inventor: Joseph Soryal, Ridgewood, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 148 days.

(21) Appl. No.: 16/512,139

(22) Filed: Jul. 15, 2019

(65) Prior Publication Data

US 2021/0022043 A1 Jan. 21, 2021

(51) Int. Cl.
*H04W 28/16* (2009.01)
*H04W 12/06* (2021.01)
*H04W 88/04* (2009.01)

(52) U.S. Cl.
CPC ........... *H04W 28/16* (2013.01); *H04W 12/06* (2013.01); *H04W 88/04* (2013.01)

(58) Field of Classification Search
CPC ...... H04W 28/16; H04W 12/06; H04W 88/04
See application file for complete search history.

(56) References Cited

U.S. PATENT DOCUMENTS

| | | | |
|---|---|---|---|
| 9,843,624 B1* | 12/2017 | Taaghol | H04L 63/0227 |
| 2003/0026221 A1* | 2/2003 | Kotzin | H04W 40/02 |
| | | | 370/329 |
| 2016/0302250 A1* | 10/2016 | Sheng | H04W 4/70 |
| 2017/0353819 A1* | 12/2017 | Yin | H04L 47/30 |
| 2019/0220601 A1* | 7/2019 | Sood | G06F 21/85 |
| 2019/0230130 A1* | 7/2019 | Beckman | H04L 67/2823 |
| 2020/0145337 A1* | 5/2020 | Keating | H04L 47/781 |
| 2020/0159205 A1* | 5/2020 | Maidment | G06F 9/5077 |
| 2020/0196155 A1* | 6/2020 | Bogineni | H04L 41/12 |
| 2020/0228623 A1* | 7/2020 | Weissman | H04L 67/32 |
| 2020/0344847 A1* | 10/2020 | Nardini | H04W 4/70 |
| 2020/0351380 A1* | 11/2020 | Fedorov | H04L 41/00 |

* cited by examiner

*Primary Examiner* — Hassan Kizou
*Assistant Examiner* — Abdullahi Ahmed
(74) *Attorney, Agent, or Firm* — Guntin & Gust, PLC; John G. Rauch

(57) ABSTRACT

A system includes a participating device, an input-output interface, and a processor coupled to the input-output interface wherein the processor is further coupled to a memory, the memory having stored thereon executable instructions that when executed by the processor cause the processor to effectuate operations including authenticating the participating device as an edge device on a network, allocating a resource on the participating device to be used for serving a user device operating on the network, receiving a request for service from the user device, and causing the participating device to provide a service to the user devices using the resource from the participating device.

20 Claims, 14 Drawing Sheets

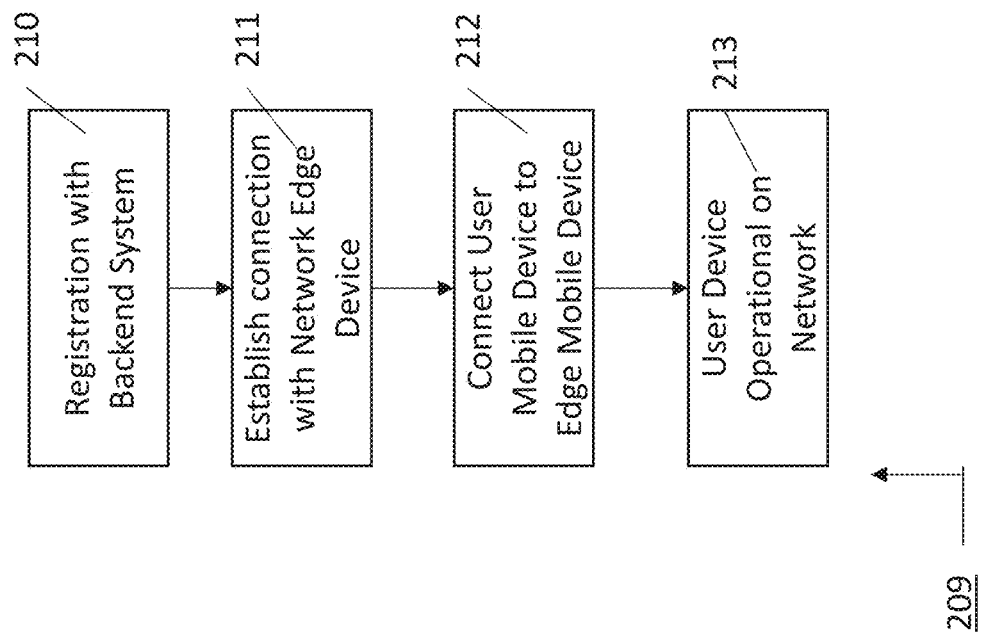

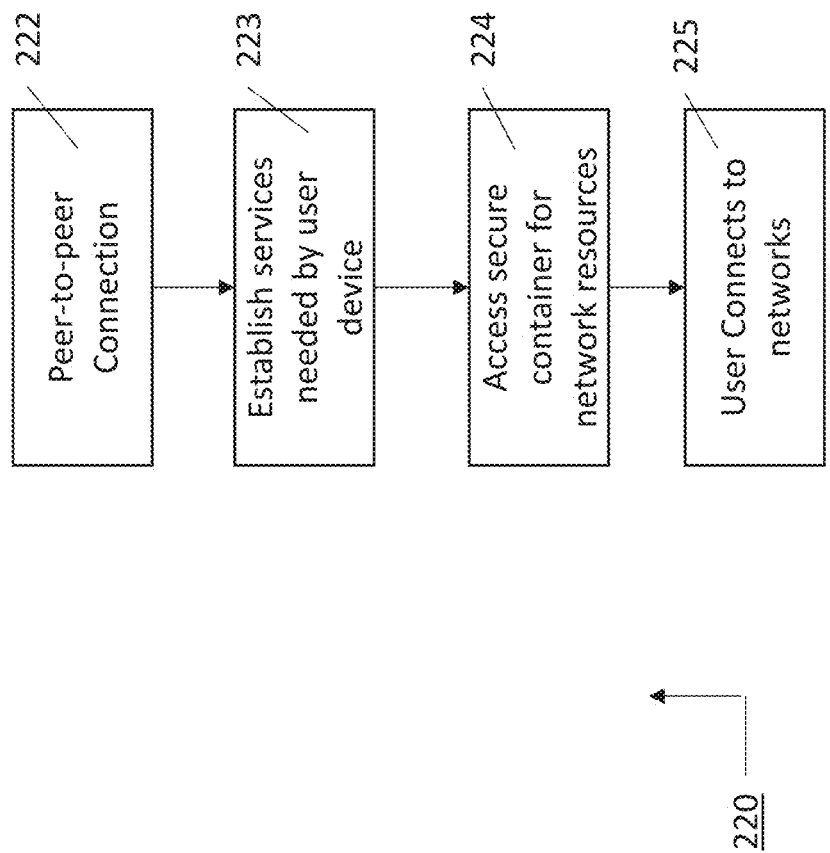

INDIVIDUAL MOBILE DEVICES AS EDGE NETWORK

TECHNICAL FIELD

This disclosure is directed to a system and method for edge computing in a network, and, more specifically, to utilizing processing capabilities in mobile devices to expand network services in an edge computing environment.

BACKGROUND

Edge computing is a distributed computing system in which processing and data storage is provided closer to the location where the processing and data storage is used or needed. As such, the computation may be performed on distributed device nodes. Edge computing pushes applications, data and computing power away from centralized points to locations closer to the user. Edge computing is useful, for example, in many internet of things applications.

As the concept of edge computing continues to grow, telecom networks such as 4G LTE and especially 5G networks need to continue to adopt such edge computing concepts. Doing so will enable additional connectivity and more efficient data processing. With the further advancement of smart phones and other smart mobile devices, the telecom networks now have significant and ever-increasing processing resources at the edge of their networks. As such, there is a need to securely and seamlessly push the edge of the network into individual mobile devices to form dynamic secure network access which is no longer constrained by geographic limits.

SUMMARY

The present disclosure is directed to a system including a participating device, an input-output interface, a processor coupled to the input-output interface wherein the processor is further coupled to a memory, the memory having stored thereon executable instructions that when executed by the processor cause the processor to effectuate operations including authenticating the participating device as an edge device on a network, allocating a resource on the participating device to be used for serving a user device operating on the network, receiving a request for service from the user device and Causing the participating device to provide the service to the user devices using the resource. The operations may further include allocating a resource on a second participating device and causing the service to be transitioned from the participating device to the second participating device. The participating device may provide an identification of the last task being executed by the user mobile device to the second participating device. The first participating device and the second participating device are in communication with a common network edge device. In an aspect, the user device may be outside of a coverage area of the network and the user device connects to the network through the participating device. The user device may be authenticated on the network through a registration process on backend server in the network.

In an aspect, a second resource is allocated on the participating device and wherein the operations further include receiving a request for a second service from a second user device and causing the participating device to provide the second service to the second user device using the second resource and wherein the first resource and the second resource are securely isolated from each other on the participating device. The participating device may have a usage profile wherein the user profile includes resources available to be allocated as an edge device. The resource may be one of a computation, storage, or routing resource.

The disclosure is also directed to a method including registering as a participating device on a network, allocating a portion of available resources on the participating device to be shared with a user device, and establishing a first communication with the user device using the portion of available resources. The method may further include handing off the first communication to an edge network device or a second participating device. In an aspect, the method may further include allocating a second portion of available resources to be shared with a second user device and establishing a second communication with the second user device. In an aspect, the method may further include establishing a second communication with an edge network device and wherein the user device is authenticated through a back-end server and the first communication is initiated by the edge network device wherein the establishing step is initiated by the user device operating outside of a coverage area of the network. The participating device may receive billing credits for sharing resources used in the first communication The disclosure is also directed to a mobile device including a processor, a user device portion configured to operate on a network, a participating device portion configured to operate as an edge device on the network wherein the participating device portion and the user device portion are isolated from each other in secure containers and an application configured to execute on the mobile device, the application having stored executable instructions in a memory that when executed by the processor cause the processor to effectuate operations including registering on the network as a participating device, receiving a first communication from a first edge device on the network, the first communication containing a request for resources to be used by a second user device, and establishing a second communication with the second user device and wherein the second communication includes providing operating resources from the participating device portion to be used by the second user device. In an aspect, the participating device portion is divided into two or more secure containers, each of the secure containers having resources to be allocated to the second user device and a third user device

BRIEF DESCRIPTION OF THE DRAWINGS

Aspects of the herein described telecommunications network and systems and methods for controlling vehicular traffic are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

FIG. 1b is a functional block diagram of an exemplary application that may be developed for use in the participating network device shown in FIG. 1a.

FIG. 2c is a flowchart illustrating an exemplary use case for a user mobile device connecting to a core network when otherwise out of range of the core network.

FIG. 2d is a flowchart illustrating an exemplary use case for a user mobile device connecting to a peer participating mobile device for services.

DETAILED DESCRIPTION

Figure 1A:
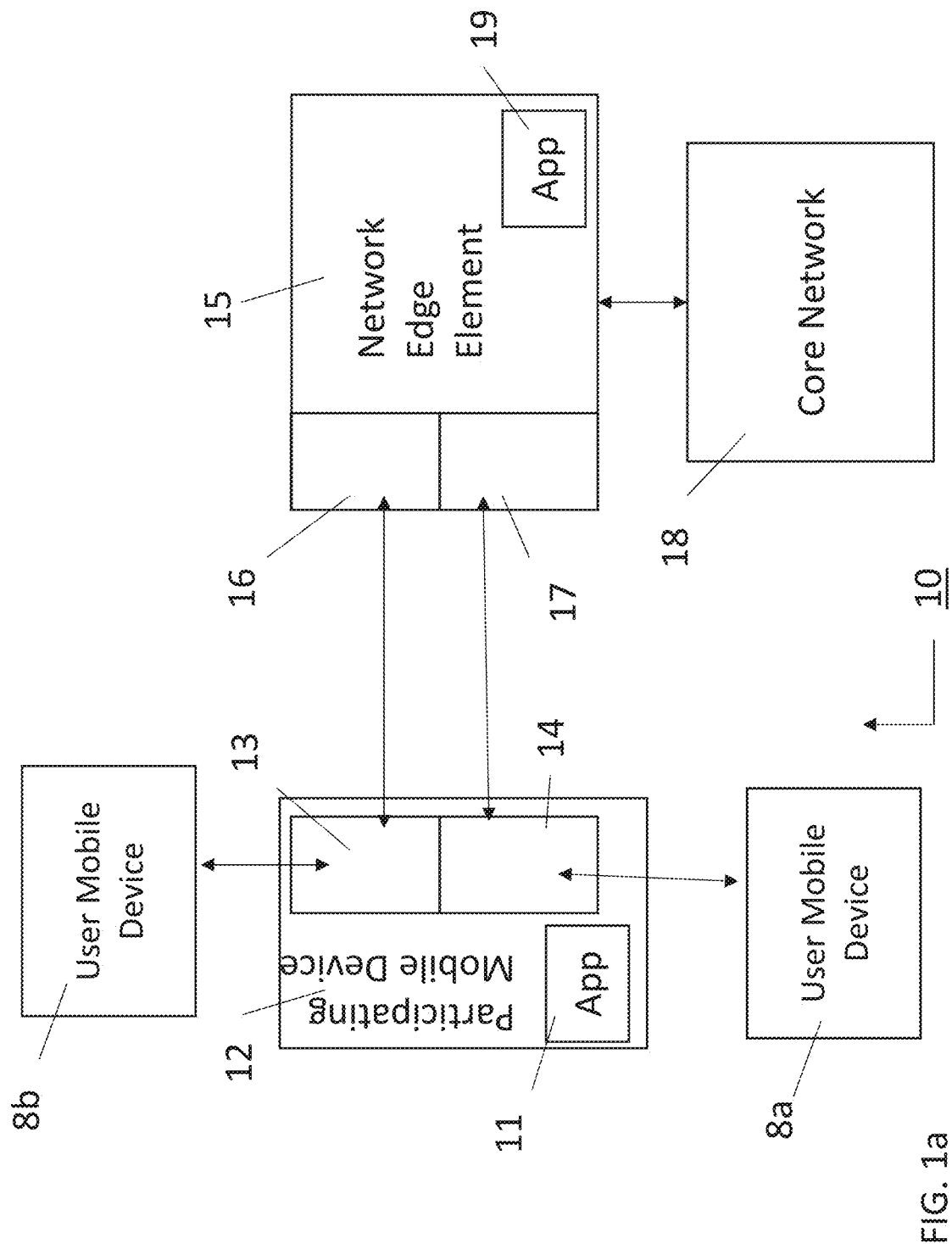
FIG. 1a is a block diagram of an exemplary operating environment in accordance with the present disclosure.

System Overview. Cellular communications systems that take advantage of edge computing techniques have pushed functionality typically located in the core network to the network edge. The system of the present disclosure pushes the network edge further to smartphones or other mobile devices connected to the network. The system utilizes a combination of fixed and mobile assets to expand network edge capabilities for time-sensitive and/or resource-intensive communications. The fixed assets may include network edge equipment, including processors and databases, connected to a wireless network. The mobile assets may include a plurality of user mobile devices which may be smartphones.

In an aspect, the disclosure includes a mechanism to push the edge network into individual mobile devices. Owners of mobile devices that elect to participate in the expanded edge concept may share some of their mobile devices' processing capability such as CPU, storage, network interfaces which then become part of the edge network. For the purposes of this disclosure, owners of such mobile devices will be referred to as "participants" and the mobile devices as "participating devices" or "participating mobile devices." For such participating devices, there may be an application executing on the participating devices in a secure isolated container within the participating devices. The participant may configure a desired level of shared resources by designating, for example, power levels, CPU processing capability, or the like, to be shared at various times or under various circumstances. Alternatively, there may be default configurations for the participating mobile device.

Each participant may have their own usage profile for their participating mobile devices. The participating mobile device and the usage profile may be registered to the nearest edge networking element upon power-up and authenticated against a backend management server in the network. Once enabled, the shared resources may be used for computation, storage, and/or routing traffic by the mobile devices of other users of the network. For the purposes of this disclosure, such users of the network will be referred to as "users" and the mobile devices as "user devices" or "user mobile devices." It will be understood that it is possible for an individual to be both a participant and a user and for a mobile device to be both a participating mobile device and a user mobile device. When used alone, "mobile device" may refer to either a participating mobile device or a user mobile device.

The system may also include network applications executing on edge networking elements and connected to the participating mobile devices in the coverage area that have opted to participate in the edge network. Based on the movement, direction, and speed of the connected user mobile devices, the edge networking elements may alert adjacent edge networking elements about the arriving user mobile device(s) to provide a seamless handoff of a user mobile device. As part of the handoff, the current edge computing device communicating with the user mobile device may also provide a copy of the authentication and last task being executed by the user mobile device to the next edge networking element that will communicate with the user mobile device.

The edge networking element may manage the collective participant mobile device resources for servicing and transitioning user mobile devices to other edge networking elements or participating mobile devices. The edge networking element may logically separate the mobile application on each participating mobile device to form isolated secure compartments to serve multiple tasks for different network users. The edge networking elements may augment the separate containers to form a single logical computation and communication unit for individual tasks. The secure isolated containers on individual participating devices are only accessible to authorized entities and not even the host participating mobile device may have such access.

In an aspect, users that are outside the coverage area of edge network elements may still connect to the network by connecting to peer mobile devices. Users that are outside the coverage area of both edge network elements and other mobile devices may still connect to the backend system via the Internet or cellular network and then access an edge network element. This and other functionality will be described in greater detail below Authentication of Network Devices. The disclosure provides a secure edge network by integrating individual mobile devices to form a logical, dynamic, scalable and secure isolated network. Each mobile device may be authenticated via a mobile device signature such as a public key mathematically related to hardware and software parameters of the device that form a private key. This private key may be referred to herein as the mobile device DNA. The device DNA may be checked against a backend authentication management server that contains the signatures (public keys) upon initial registration. These are known as the permanent keys. Each network edge node, upon verifying and authenticating the mobile device, may create a temporary key pair for the life of a specific task. The temporary key may allow unrestricted access to containers working on the same task.

It may be possible that the container be divided between multiple tasks. In that case, each task may be assigned a different temporary key operable on a single device.

Operating Environment. FIG. 1 shows an exemplary system 10 having user mobile devices 8a, 8b in communication with participating mobile device 12. Participating mobile device 12 is in communication with an edge network element 16. Participating mobile device 12 is also described in more detail with reference to FIG. 4 and FIG. 5 as UE 414 and processor 500, respectively. The communication between participating mobile device 12 and edge network element 16 may be through any wireless communication network or method, including but not limited to cellular 4G LTE and 5G networks. Each participating mobile device 12 may have an application 11 running thereon which allocates a portion of its local resources, including but not limited to, CPU processing, power, network access through a network interface card, network bandwidth, storage, access to peripherals, or any other functionality on the participating mobile device 12 to the network for extension of edge computing capabilities. The allocation of each set of shared resources for individual tasks may be isolated in one or more secure containers 13, 14. While two secure containers 13, 14 are shown, it will be understood that the number of secure containers 13, 14 on each participating device 12 may vary by location, network load, time of day, or resources required by participating devices for their own usage such as video or voice calls or high bandwidth streaming or other heavy resource usage applications. For example, secure container 13 may be allocated 10% of the CPU processing power of participating device 12 while secure container 14 may be allocated 15% of the CPU processing power of the participating device 12.

Continuing with the description of FIG. 1, there is also shown a network edge element 15. The network edge element may be part of a larger communication network having a core network 18 described in more detail herein. The network edge 15 may have radio access network (RAN) functionality configured to communicate with both participating mobile devices 12 and user mobile devices 8a, 8b. With the network edge element 15, there is shown two individual task containers, 16, 17 configured to communicate with secure containers 13, 14. Each network edge element 15 may have an application 19 resident and running on the network edge element 15.

Unlike traditional computing resources, network edge element 15 may be assigned or designated to work with data within a specific geographic area. Network edge element 15 may be located in or near its assigned geographic area. In an aspect, the network edge element 15 may be configured to communicate with both the participating mobile device 12 and directly or indirectly to user mobile devices 8a, 8b in the geographic area. While FIG. 1 shows one participating mobile device 12 in communication with one network edge element 15, it will be understood that a single network edge element 15 may communicate with multiple participating mobile devices 12.

Figure 1B:
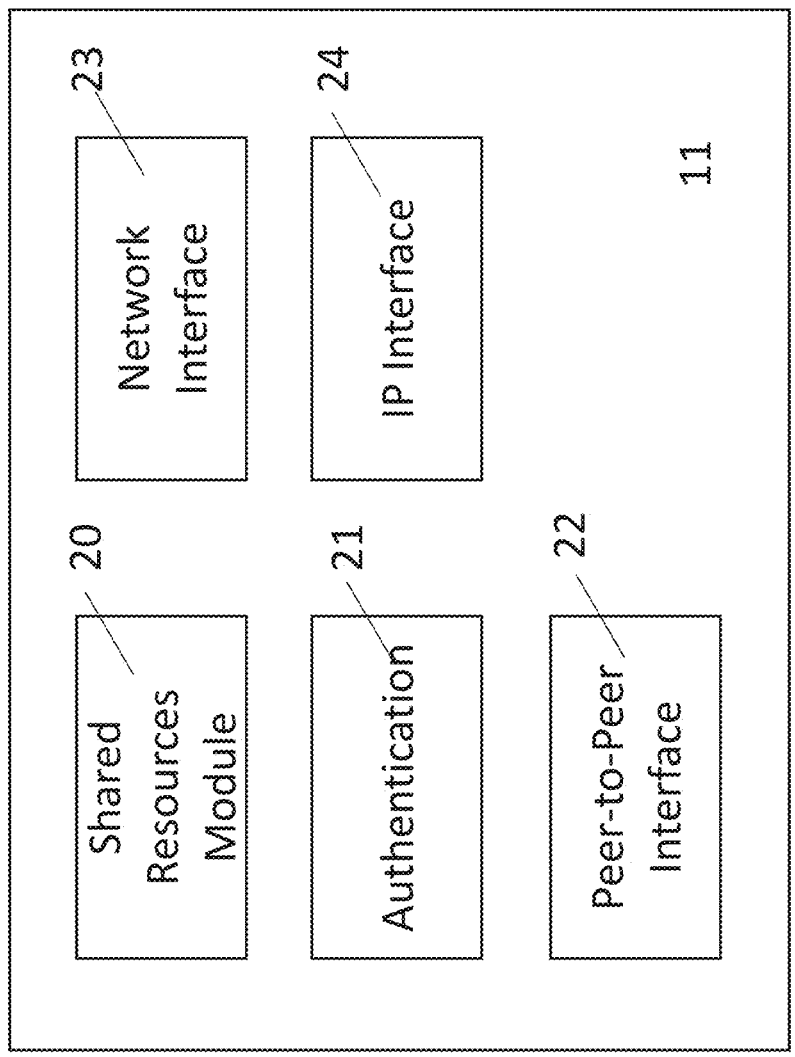

FIG. 1b shows an exemplary block functional diagram of an application 11 running on participating mobile device 12. The application 11 may have an authentication module 21 to register on a backend management system 36 through the network edge element 15 to enable the mobile device to become a participating mobile device 12. In an aspect, the network is expanded as a secure edge network by integrating individual participating mobile devices 12 to form a logical, dynamic, scalable and secure isolated network. Each participating mobile device 12 may be authenticated via a participating mobile device 12 signature such as a public key which is mathematically related to hardware and software parameters of the participating mobile device 12 that form a private key. This private key may be referred to herein as the participating mobile device 12 DNA. The participating mobile device 12 DNA may be checked against a backend authentication management server 36 that contains the signatures (public keys) associated with mobile devices upon initial registration. These will be referred to as the "permanent keys.". Each network edge element 15, upon verifying and authenticating the participating mobile device 12, may create a temporary key pair for the life of a specific task. The temporary key pair may allow unrestricted access to containers 13, 14 working on the same task. It may be possible that the container 13, 14 be divided between multiple tasks. In that case, each task may be assigned a different temporary key operable on a single participating mobile device 12 and be authenticated accordingly.

Upon successful authentication, the shared resource module 21 may receive instructions to allocate resources on the participating mobile device 12 to use for one or more user mobile devices 8a, 8b. The shared resource module 21 may allocate one or more resources to a user mobile device 8a, 8b to one or more task assigned by the network edge element 15. Included in the shared resources may be a slice of a network interface managed by the network interface module 23. A user mobile device 8a, 8b may communicate with the participating mobile device 12 using a peer-to-peer communication link managed by peer-to-peer interface module 22 and then communicate to the network edge element through a network interface. The application 11 may also include an internet protocol (IP) module 23 for communicating using IP protocol.

Figure 2A:
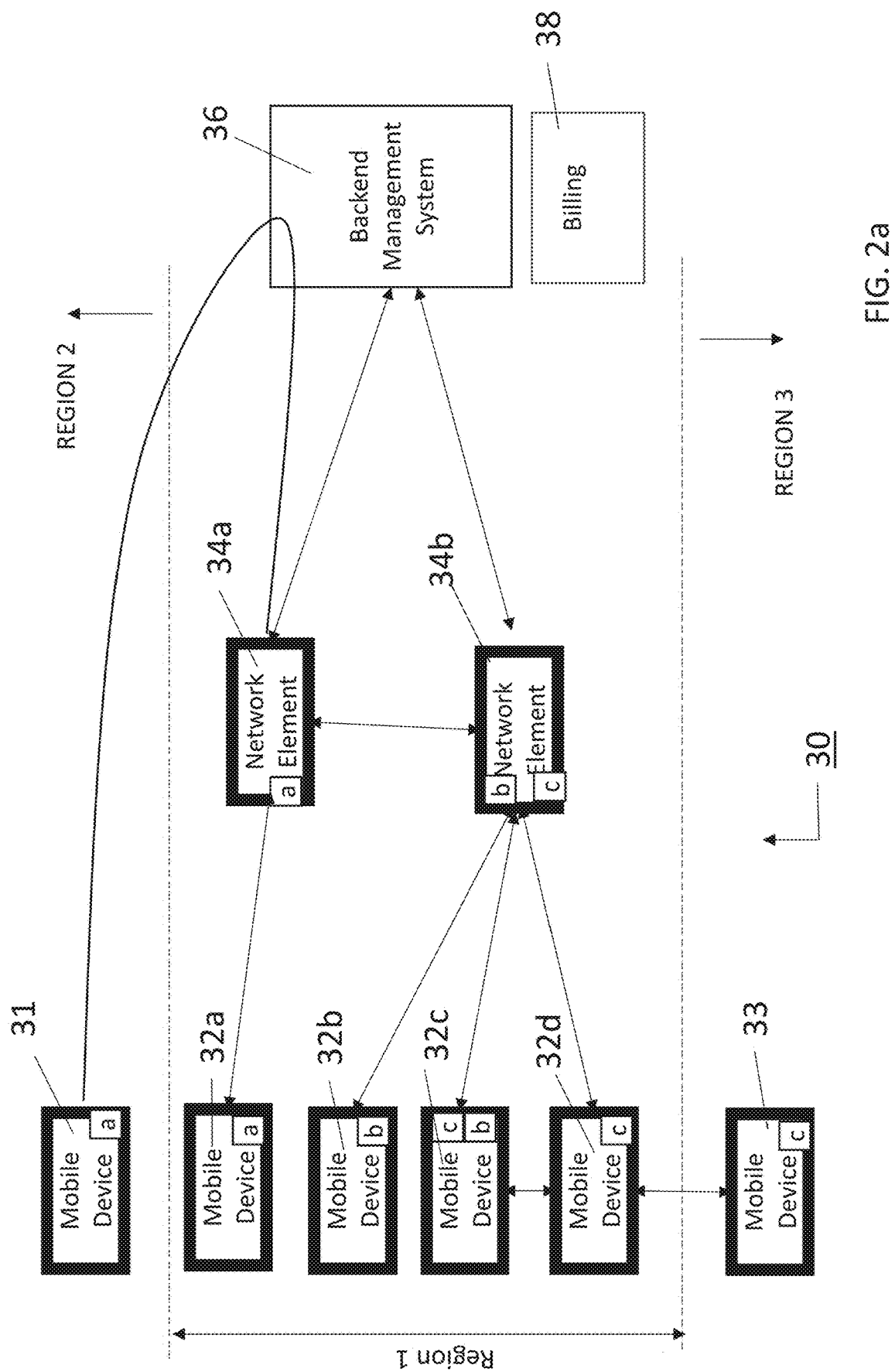
FIG. 2a is a functional block diagram of an exemplary operating environment illustrating multiple use cases of the present disclosure.

Operations. An exemplary operational architecture 30 is illustrated in FIG. 2a. There is shown two network edge elements 34a, 34b. As set forth previously, network edge elements 34a, 34b may be geographically located to provide telecommunications and computer processing closer to the areas where such services are needed. In this example, network edge elements 34a, 34b are both located in region 1, while there are no network edge elements located in regions 2 or 3.

There is also shown four participating mobile devices 32a, 32b, 32c, 32d, all located in geographical region 1. All four participating mobile devices 32a, 32b, 32c, 32d may be registered and authenticated with backend management server 36. Participating mobile device 32a is shown with one secure container 42 that is configured to provide shared resources to a user mobile device. User mobile devices are shown as 8a, 8b in FIG. 1, but are not shown in region 1 in FIG. 3. It will be understood that the same or similar configuration exists for any user mobile devices in region 1 in FIG. 3. The participating mobile device 32a is shown operating in conjunction with network edge element 34a whereby secure container coded as "a" within participating mobile device 32a interacts with a corresponding container "a" on network element 34a. That link provides the ability for participating mobile device 32 to share resources with a user mobile device 31 in Region 2 for task "a" described below.

Continuing with the description in FIG. 2a, network edge element 34b is shown interacting with 3 participating mobile devices 32b, 32c, 32b. There is shown task "b" which is shown connected to secure container "b" in participating mobile device 32b and secure container "b" within participating mobile device 32c to provide services to a user mobile device in Region 1. If the user mobile device first interacts with participating mobile device 32b and then by its speed and direction begins to lose contact with participating mobile device 32b, then network edge element 34b will coordinate a seamless handoff of the user mobile device to participating mobile device 32c. User mobile device identification, task and other relevant information may be passed to participating mobile device 32c and upon successful transition, the shared resources of mobile device 32b may be released. It will be noted that in addition to a handoff from one participating mobile device to another participating mobile device, there may be handoffs between network edge elements 34a, 34b.

There is also shown user mobile device 33 located in region 3 which in this example is assumed to be outside the coverage area of the core network 18 and network edge elements 34a and 32b. What otherwise would be deemed to be in a "No Service Available" geographic area, user mobile device 33 may still be able to receive service through the expanded edge network through participating mobile device 32d. User mobile device 33 may communicate with participating mobile device 32d using peer-to-peer communications and accessing secure container "c" to acquire shared resources to connect to the network 18. Participating mobile device 32d may use its own resources or leverage the resources of network edge element 34b and participating mobile device 32c using secure containers labeled "c".

The system and method of the present disclosure may be extended to provide network coverage internationally. For example, geographic zone 2 may be located outside of the home country. Participating mobile device 32a may be used to provide shared resources to user mobile device 31. User mobile device 31 may connect to the backend management system 36 via the Internet or roaming cellular network then to the network edge element 34a and to participating mobile device 32a through secure containers labeled "a". This allows a user mobile device 31 to use resources on its home network while traveling internationally, possibly avoiding international roaming charges.

There is also shown a billing system interface 38. User mobile devices, for example, user mobile devices 31, 33 that desire or require the shared resources may be charged for the increased use of resources. Participating mobile devices 32a, 32b, 32c, 32d may obtain billing credits for sharing of their resources or trade those resources for resources that they may need when the participating mobile devices 32a, 32b, 32c, 32d are user mobile devices.

Figure 2B:
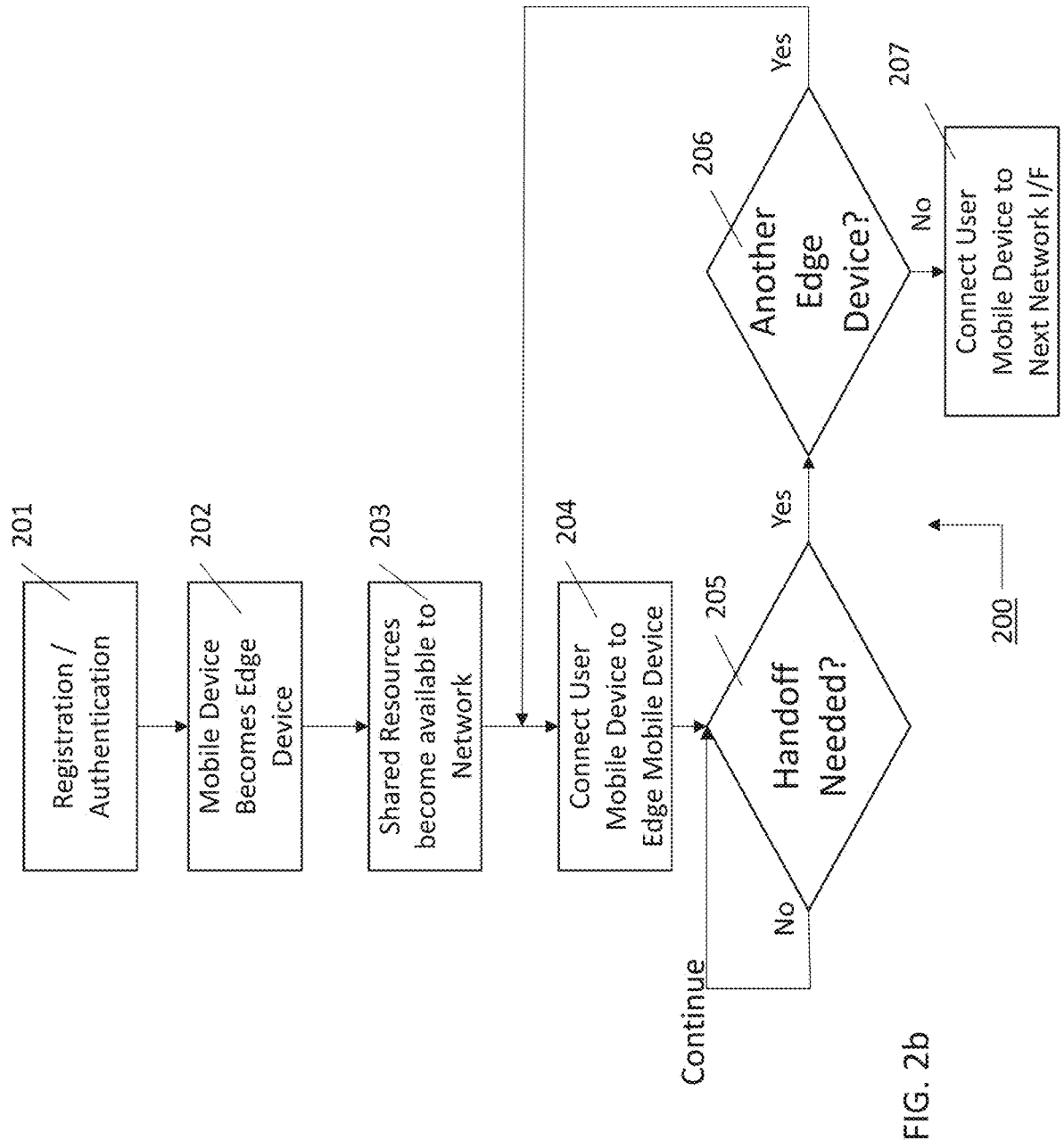
FIG. 2b is a flowchart of an exemplary method of connecting and using participating mobile devices as edge network devices.

FIG. 2b is a flowchart for a method 200 for a participating mobile device 12. At 201, the participating mobile device registers with and is authenticated with the backend management server 36. At 202, the network edge element enables the participating mobile device to become an edge device. At 203, the participating mobile device makes its resources available to the network edge device. At 204, the user mobile device is connected to the participating mobile device are used to provide services to the user mobile device. The processing continues until 205 when it is determined whether a hand-off of the user mobile device is required. If so, then at 206 it is determined whether another participating mobile device is available as a network interface to receive the hand-off. If so, then the user device is connected to the participating mobile device back at 204 and the process repeats. If there is no available participating mobile device, then the user device is handed off to the next available network interface resource at 207.

FIG. 2c shows an exemplary process 209 for connecting a user mobile device to a network when the user mobile device is outside of the normal network coverage. At 210, the user mobile device registers with a backend management system though an interface such as, for example, the Internet or through a wireless network operated by another provider. At 211, the backend management system establishes a connection with a network edge element. At 212, the network edge element establishes a connection and defined tasks with a participating mobile device. At 213, the user device is operational on the network using resources made available by the participating mobile device.

FIG. 2d shows an exemplary process 220 illustrating a method by which a user device 8a may connect to the core network 18 through a participating mobile device 11. At 222, a peer-to-peer communication link is established between the user device 8a and the participating mobile device 11. At 223, the resources requested by the user mobile device 8a are conveyed to the participating mobile device 11. At 224, the allocated resources are isolated in a secure container and accessed by the user mobile device 8a. At 225, the user mobile device 8a establishes its connection to the core network through the shared resources of participating mobile device 11.

In accordance with the above description, the system and method of the present disclosure provides a practical application that advances the state of the telecommunications technology by creating a mechanism to push the edge of the network into individual participating mobile devices within the edge network coverage area or remote from that coverage area. Moreover, the system and method of the present disclosure provide the capability to securely and seamlessly integrate these individual participating mobile devices to form dynamic secure network that is not limited by geographical areas or what would otherwise be constrained by such geographical areas.

In an exemplary operational feature, each user of a participating mobile device may contribute resources to the network and receive similar resources upon request from other participating mobile devices. Alternatively, a user mobile device may simply purchase the shared resources as needed without allocating its own shared resources to others.

Figure 3:
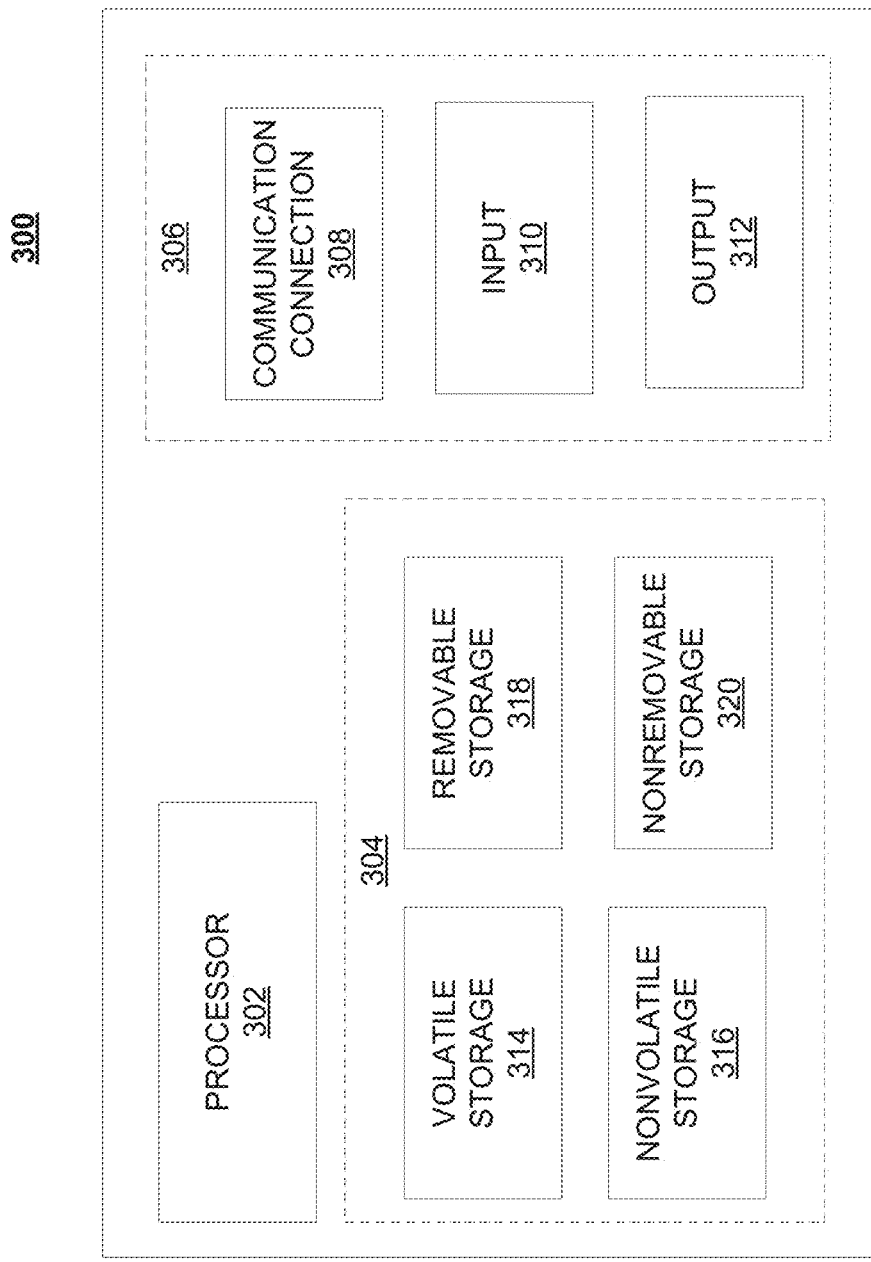
FIG. 3 is a schematic of an exemplary network device.

Device and Network Description. FIG. 1 shows a box labeled core network 18. What follows is an exemplary description of a core network 18. FIG. 3 is a block diagram of network device 300 that may be connected to or comprise a component of edge computing node 104 or connected to edge computing node 104 via a network. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
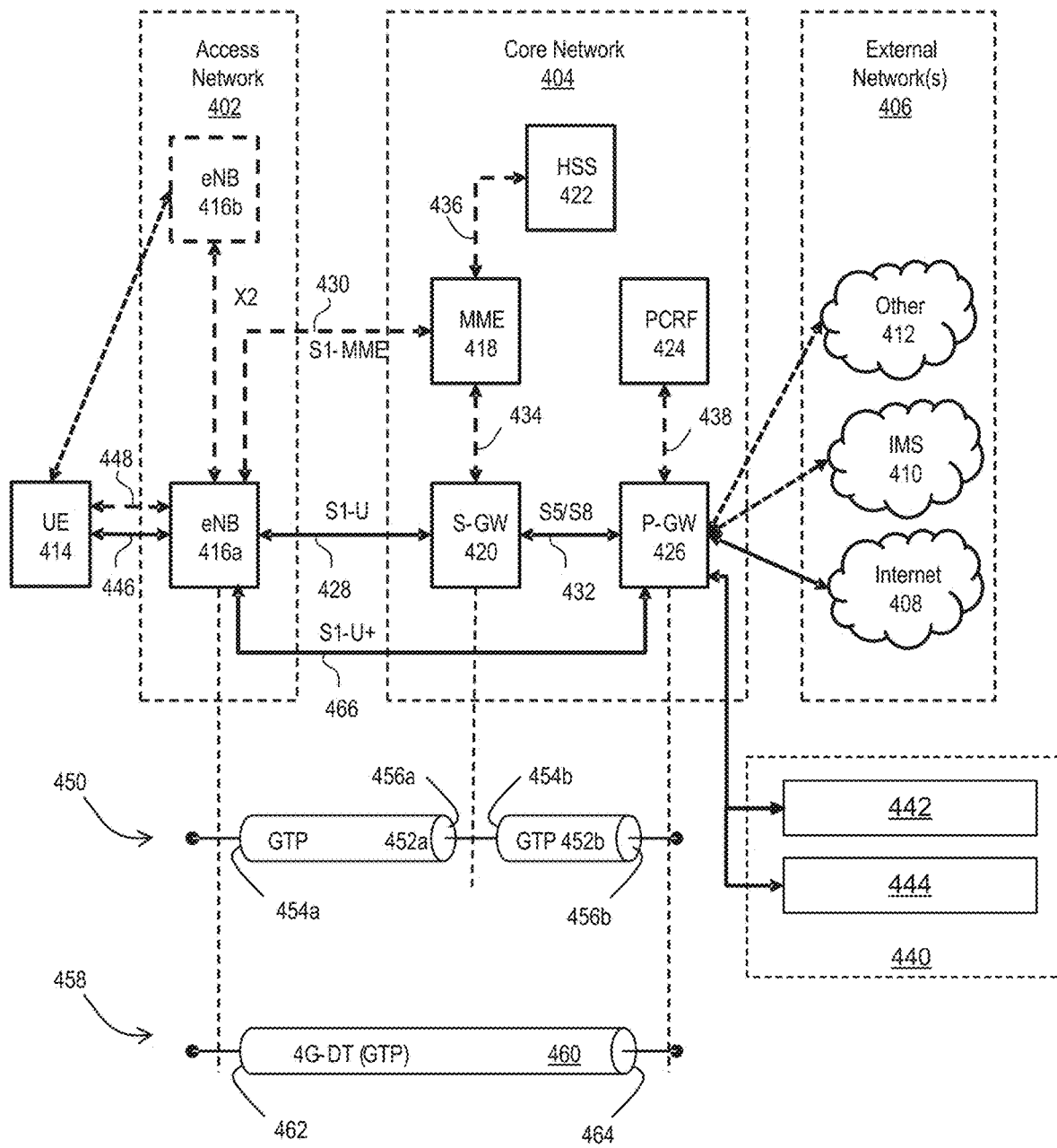
FIG. 4 depicts an exemplary communication system that provide wireless telecommunication services over wireless communication networks with which edge computing node may communicate.

FIG. 4 illustrates a functional block diagram depicting one example of an LTE-EPS network architecture 400 related to the current disclosure. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal Mobile Telecommunication System Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an Sha signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416*a* and PGW 426. Notably, S1-U+ path/interface does not include SGW 420, a node that is otherwise instrumental in configuring and/or managing packet forwarding between eNB 416*a* and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively, or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMES 418, SGWs 420 or PGWs 426.

In the illustrative example, data traversing a network path between UE 414, eNB 416*a*, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416*a*, a second portion (e.g., an S1 data bearer 428) between eNB 416*a* and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416*a*, and a second signaling portion (e.g., S1 signaling bearer 430) between eNB 416*a* and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452*a* between two tunnel endpoints 454*a* and 456*a*, and a second tunnel 452*b* between two tunnel endpoints 454*b* and 456*b*. In the illustrative example, first tunnel 452*a* is established between eNB 416*a* and SGW 420. Accordingly, first tunnel 452*a* includes a first tunnel endpoint 454*a* corresponding to an S1-U address of eNB 416*a* (referred to herein as the eNB S1-U address), and second tunnel endpoint 456*a* corresponding to an S1-U address of SGW 420 (referred to herein as the SGW S1-U address). Likewise, second tunnel 452*b* includes first tunnel endpoint 454*b* corresponding to an S5-U address of SGW 420 (referred to herein as the SGW S5-U address), and second tunnel endpoint 456*b* corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPvl-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual basis. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
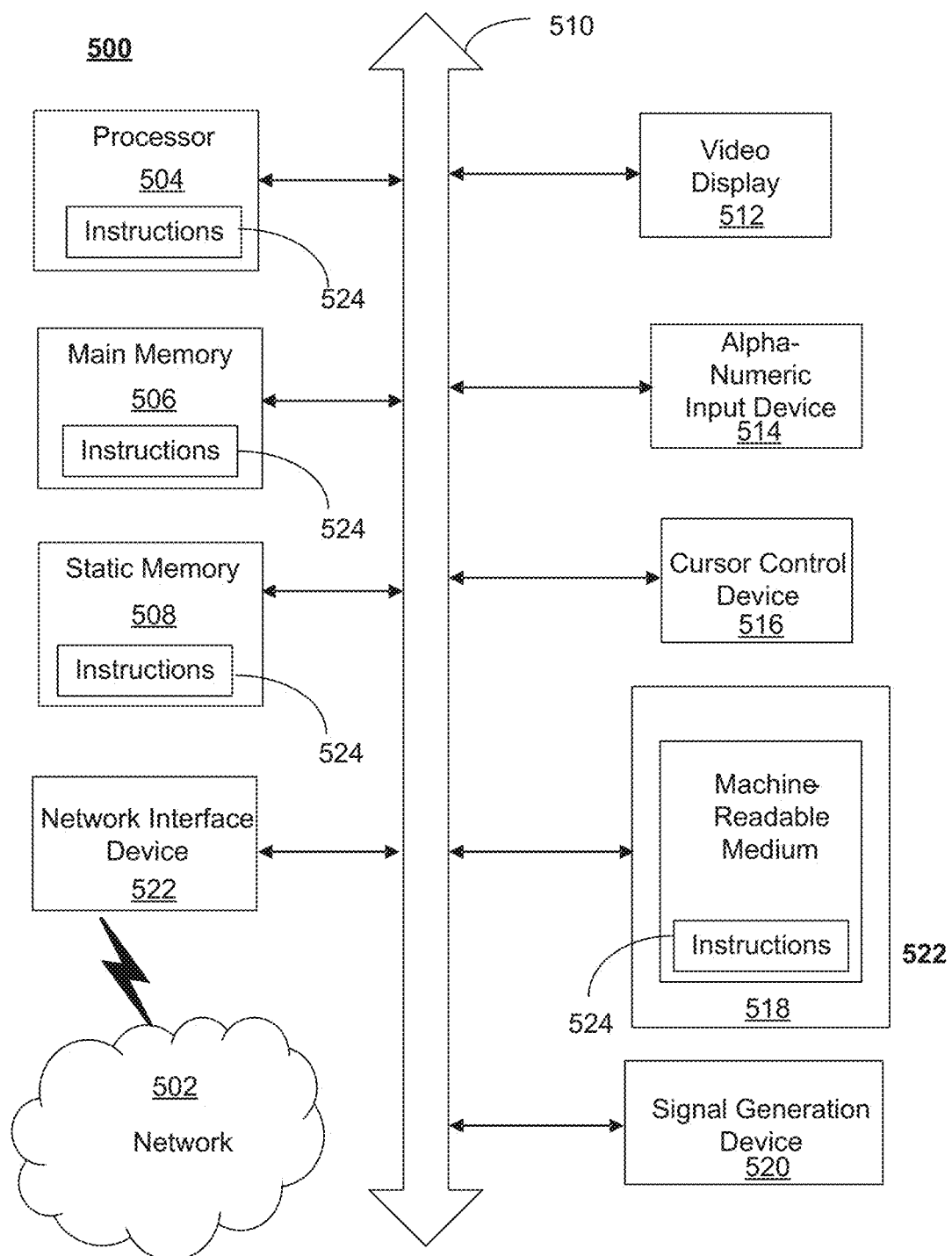
FIG. 5 depicts an exemplary communication system that provide wireless telecommunication services over wireless communication networks with which edge computing node may communicate.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
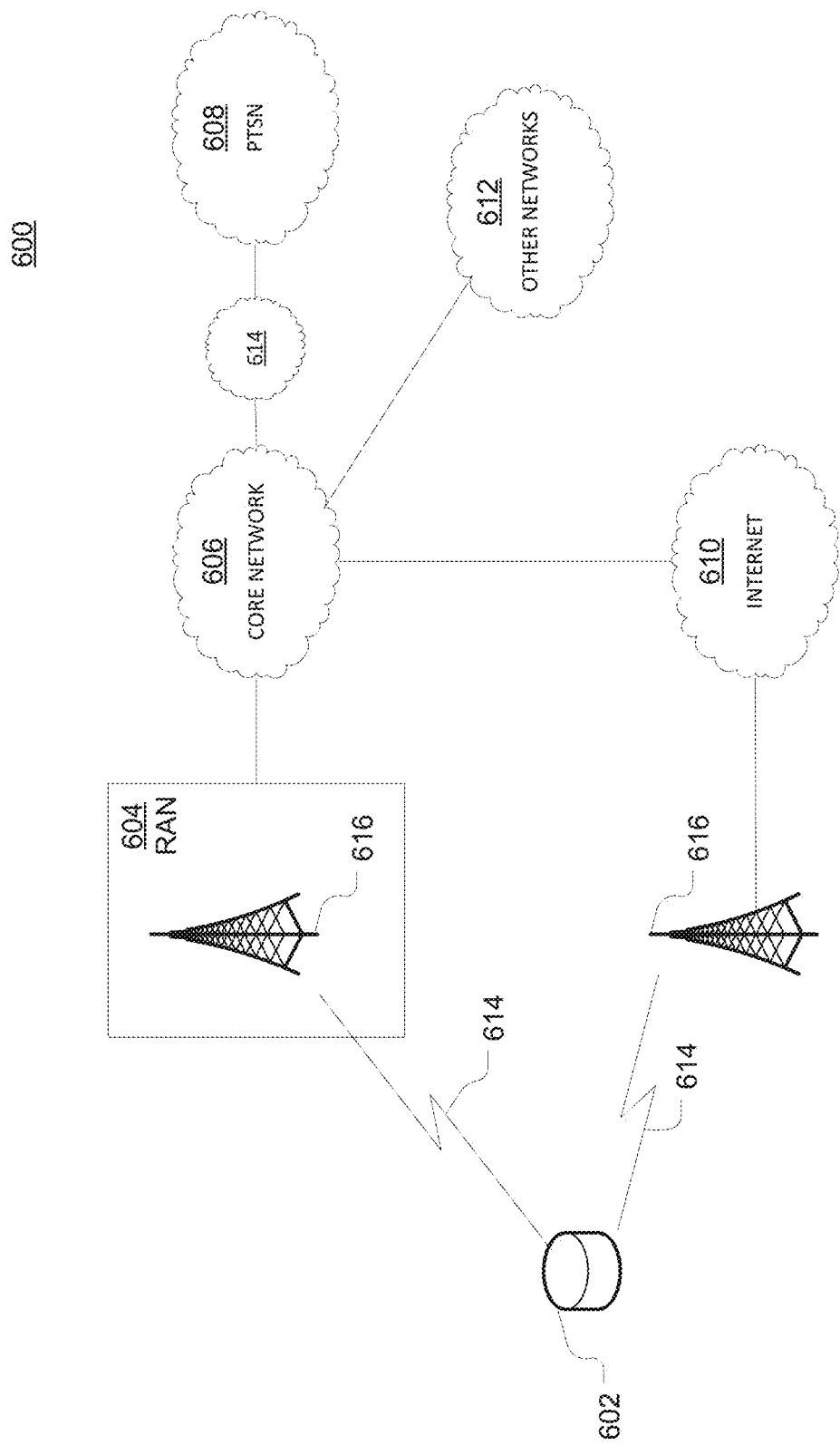
FIG. 6 is a diagram of an exemplary telecommunications system in which the disclosed methods and processes may be implemented with which edge computing node may communicate.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
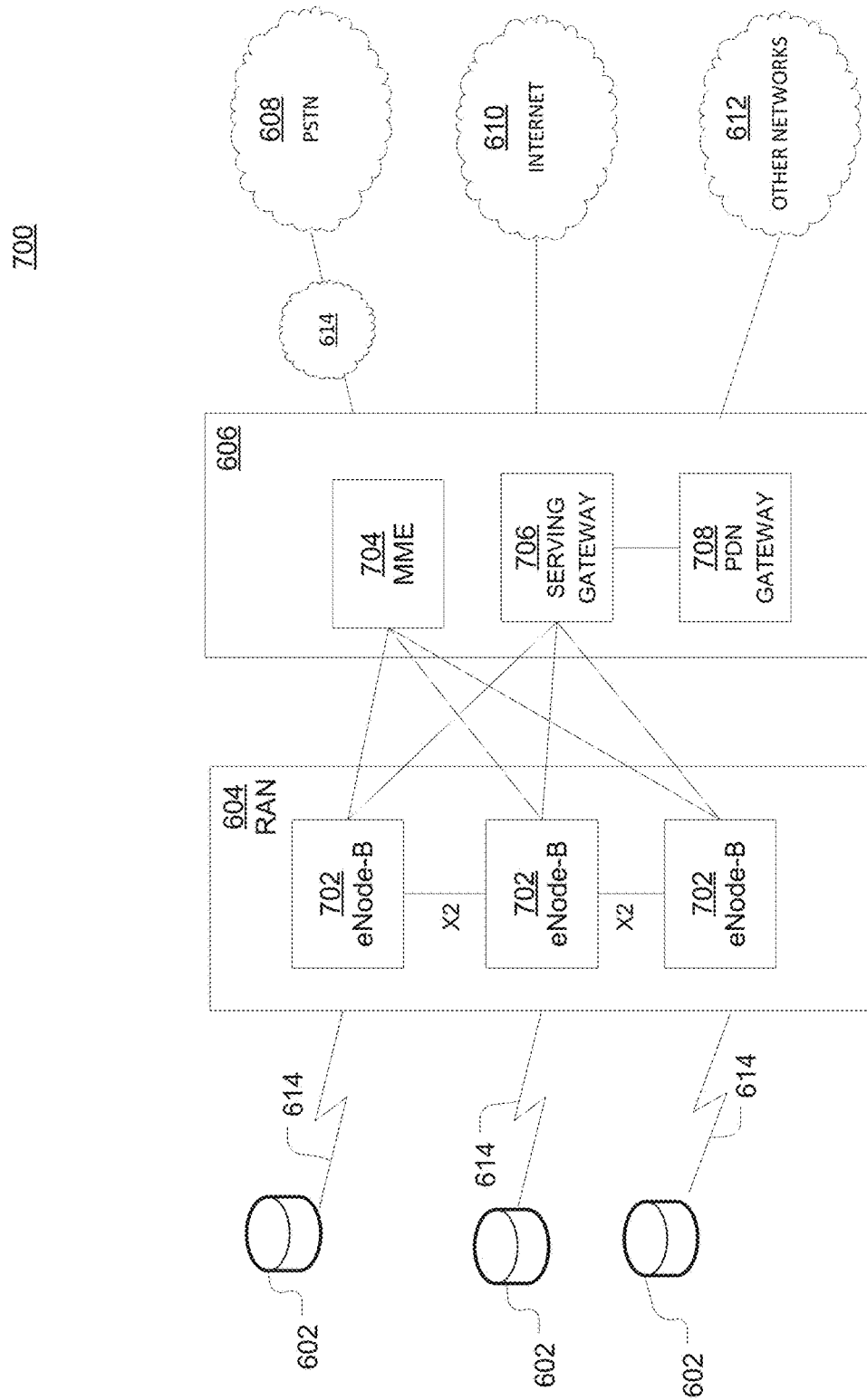
FIG. 7 is an example system diagram of a radio access network and a core network with which edge computing node may communicate.

FIG. 7 is an example system 400 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
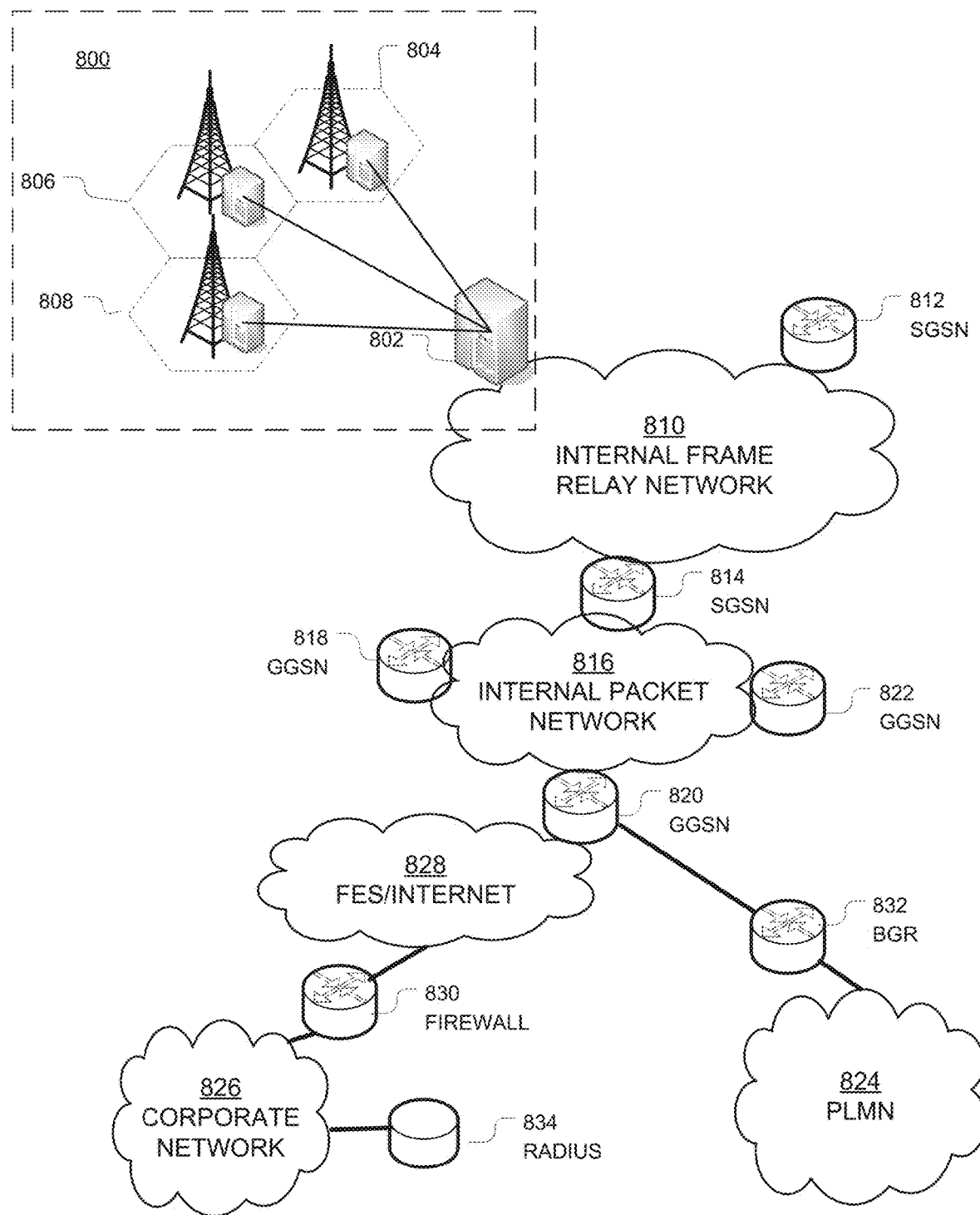
FIG. 8 depicts an overall block diagram of an example packet-based mobile cellular network environment, such as a general packet radio service (GPRS) network, with which edge computing node may communicate.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
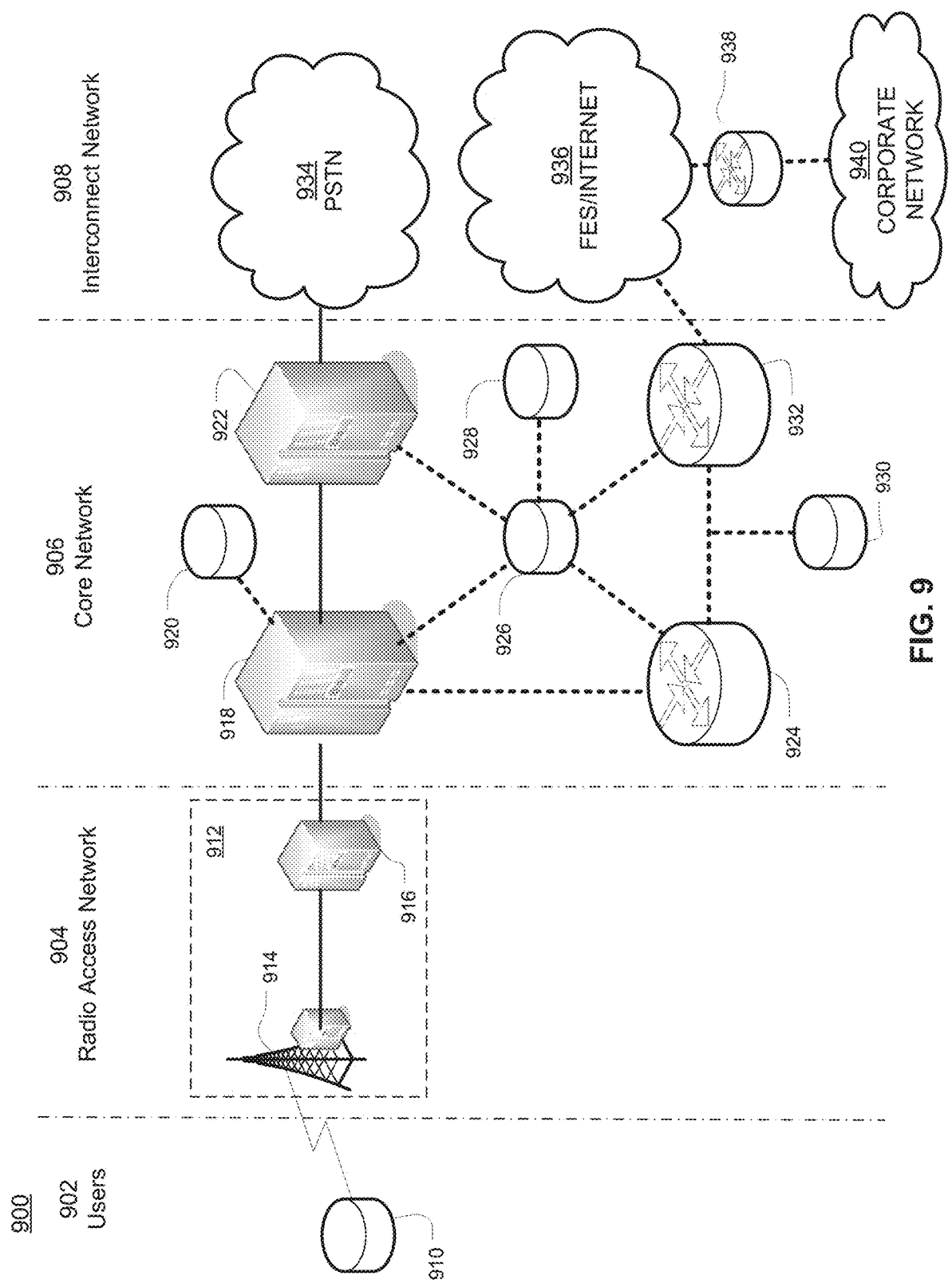
FIG. 9 illustrates an exemplary architecture of a GPRS network with which edge computing node may communicate.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
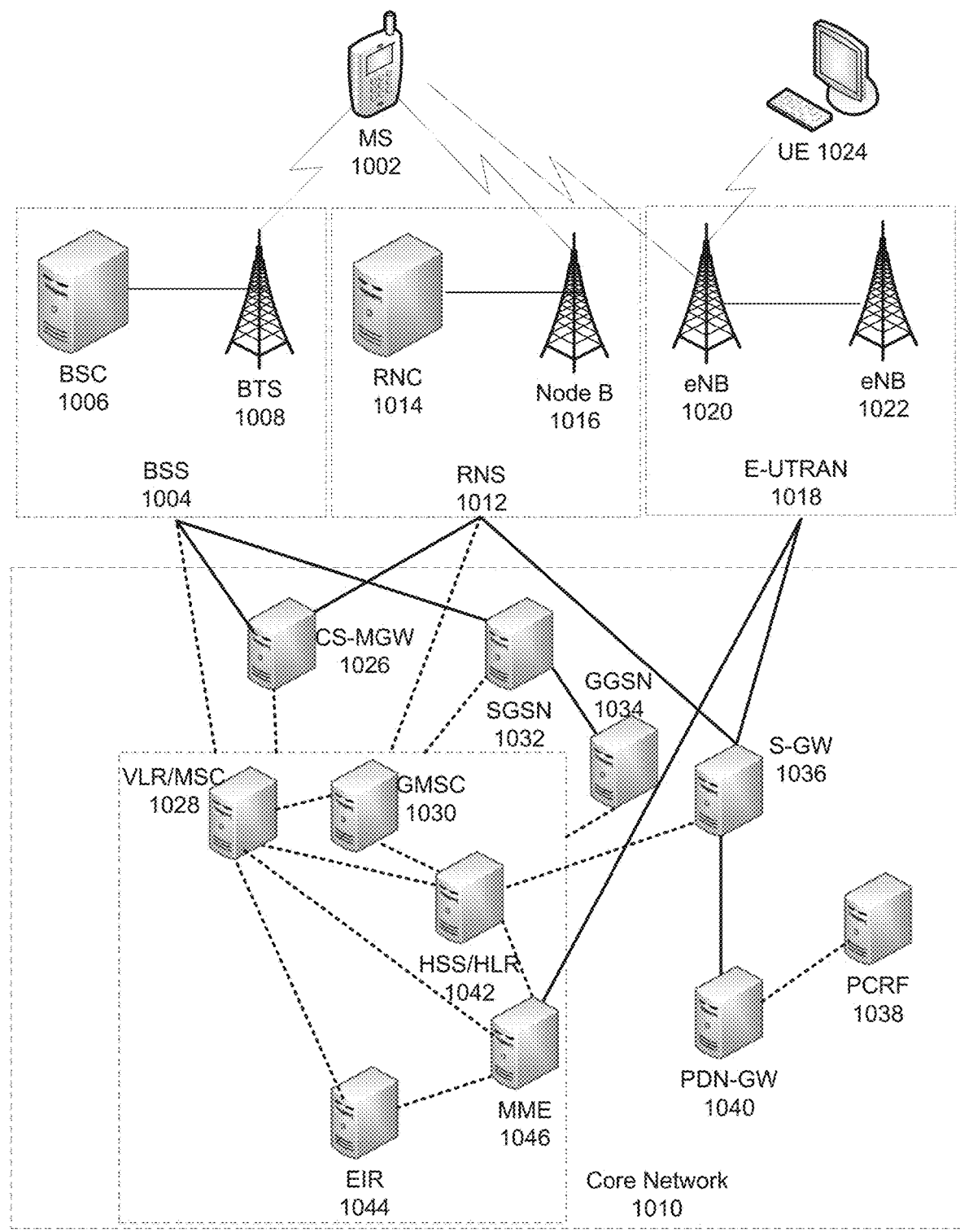
FIG. 10 is a block diagram of an exemplary public land mobile network (PLMN) with which edge computing node may communicate.

FIG. 10 illustrates a PLMN block diagram view of an example architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically, MS 1002 may communicate with any or all of BSS 1004, RNS 1012, or E-UTRAN 1018. In an illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010 and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life— especially for simple M2M devices—through enhanced wireless management.

While examples of a telecommunications system in which emergency alerts can be processed and managed have been described in connection with various computing devices/ processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

The invention claimed is:

1. A system comprising:
   a first participating mobile device operating on a mobile network;
   a user device operating on the mobile network;
   an input-output interface;
   a processing system including a processor coupled to the input-output interface wherein the processing system is further coupled to a memory, the memory having stored thereon executable instructions that when executed by the processing system cause the processing system to effectuate operations comprising:

identifying that the user device is outside a coverage area of the mobile network;
identifying that the first participating mobile device is within the coverage area of the mobile network;
authenticating the first participating mobile device as an edge device on the mobile network;
allocating a first resource associated with a first service of the mobile network on the first participating mobile device to be used for serving the user device;
receiving a request for the first service from the user device; and
causing the first participating mobile device to provide the first service to the user device using the first resource.

2. The system of claim 1, wherein the operations further comprise allocating a second resource associated with the first service on a second participating mobile device and causing the first service to be transitioned from the first participating mobile device to the second participating mobile device.

3. The system of claim 2, wherein the first participating mobile device provides an identification of a last task being executed by the user device to the second participating mobile device.

4. The system of claim 2, wherein the first participating mobile device and the second participating mobile device are in communication with a common network edge device.

5. The system of claim 1, wherein the user device connects to the mobile network through the first participating mobile device.

6. The system of claim 1, wherein the user device is authenticated on the mobile network.

7. The system of claim 6, wherein the user device is authenticated on the mobile network through a registration process on a backend server in the mobile network.

8. The system of claim 1, wherein a third resource is allocated on the first participating mobile device and wherein the operations further comprise receiving a request for a second service associated with the mobile network from a second user device and causing the first participating mobile device to provide the second service to the second user device using the third resource.

9. The system of claim 8, wherein the first resource and the third resource are securely isolated from each other on the first participating mobile device.

10. The system of claim 1, wherein the first participating mobile device has a usage profile wherein the usage profile includes resources available to be allocated as an edge device.

11. The system of claim 1, wherein the first resource is one of a computation, storage, or routing resource.

12. A method comprising:
registering, by a mobile device including a processor, as a participating mobile device on a mobile network, wherein the mobile device is within a coverage area of the mobile network;
authenticating the participating mobile device as an edge device through a back-end server on the mobile network;
allocating, by the mobile device, a portion of available resources to be shared with a user device, wherein the user device is outside the coverage area of the mobile network;
establishing, by the mobile device, a first communication with the user device using the portion of available resources; and
providing, by the mobile device, a first service to the user device using the portion of available resources of the participating mobile device.

13. The method of claim 12, further comprising handing off, by the mobile device, the first communication to one of an edge network device or a second participating device.

14. The method of claim 12, further comprising allocating, by the mobile device, a second portion of available resources to be shared with a second user device and establishing a second communication with the second user device.

15. The method of claim 12, further comprising establishing, by the mobile device, a second communication with an edge network device and wherein the user device is authenticated through the back-end server and the first communication is initiated by the edge network device.

16. The method of claim 12, wherein the establishing of the first communication is initiated by the user device.

17. The method of claim 12, further comprising receiving billing credits for sharing resources used in the first communication.

18. A mobile device comprising:
a processing system including a processor;
a user device portion configured to operate on a mobile network;
a participating mobile device portion configured to operate as an edge device on the mobile network wherein the participating mobile device portion and the user device portion are isolated from each other in secure containers;
an application configured to execute on the mobile device, the application having stored executable instructions in a memory that when executed by the processing system cause the processing system to effectuate operations comprising:
identifying that a second user device is outside a coverage area of the mobile network;
identifying that the mobile device is within the coverage area of the mobile network;
registering on the mobile network as a participating mobile device;
receiving a first communication from a first edge device on the mobile network, the first communication containing a request for resources to be used by the second user device; and
establishing a second communication with the second user device.

19. The mobile device of claim 18 wherein the second communication includes providing operating resources from the participating mobile device portion to be used by the second user device.

20. The mobile device of claim 18 wherein the participating mobile device portion is divided into two secure containers, each of the secure containers having resources to be allocated to the second user device and a third user device.

* * * * *

UNITED STATES PATENT AND TRADEMARK OFFICE
CERTIFICATE OF CORRECTION

PATENT NO. : 11,438,803 B2  
APPLICATION NO. : 16/512139  
DATED : September 6, 2022  
INVENTOR(S) : Joseph Soryal Page 1 of 1

It is certified that error appears in the above-identified patent and that said Letters Patent is hereby corrected as shown below:

In the Specification

Column 13, Line 2, the word "Sha" should be replaced with the word "S6a".

Signed and Sealed this  
Eleventh Day of October, 2022

Katherine Kelly Vidal  
*Director of the United States Patent and Trademark Office*